Patented Feb. 16, 1954

2,669,569

UNITED STATES PATENT OFFICE 2,669,569

PROCESS OF PRODUCING PHTHALOCYANINE PIGMENTS

Thomas D. Mutaffis, North Plainfield, N. J., assignor to American Cyanamid Company, New York, N. Y., a corporation of Maine No Drawing. Application October 17, 1951, Serial No. 251,817

6 Claims. (Cl. 260—314.5)

This invention relates to the preparation of improved phthalocyanine pigments and more particularly to an improved process for finishing metal phthalocyanines and chlorinated derivatives thereof in a finely-divided form exhibiting high tinctorial strength.

Tinting strength is an important factor in phthalocyanine pigments. It is generally recognized that tinting strength increases as the size of the pigment crystals decrease, thereby exposing more surface area. In order for a phthalocyanine pigment to be commercially acceptable to the trade, it is also generally recognized that the ultimate pigment particle size should be of the order of a fraction of a micron.

Various proposals have been suggested in the past for accomplishing this result. One method has made use of ball-milling the pigment in the presence of an organic liquid as the suspending medium. This method suffers from the disadvantage that an excessive grinding time, usually a matter of days, is necessary in order to develop the requisite pigment strength.

Another method has proposed using coarsely ground salt in a ball mill along with an organic liquid. This method likewise does not result in any shortening of the time required for the development of the desired strength.

Still another method has employed a thick plastic magma, consisting of pigment, organic liquid and a solid grinding aid, which is subjected to a shearing and mixing action in a dough mixer or other suitable apparatus. While this method has resulted in a considerable shortening of the time required to develop ultimate pigment strength, nevertheless, it does suffer from certain inherent economic disadvantages.

The grinding aids of the prior art have consisted either of ordinary coarsely ground particles or have consisted of smaller particles having a surface area of 0.06 square meter per gram.

I have discovered that by the use of extremely finely-divided solid grinding aids having a surface area more than twice the area of the particles heretofore used it is possible to shorten the grinding time necessary to develop the ultimate pigment strength to a considerable degree. As ancillary thereto, I have discovered that for equal times of grinding in the same suspending liquid, the finer the degree of subdivision of the solid grinding aid the greater is the tinting strength, brightness and depth of masstone of the finished pigment.

Essentially, the present invention resides in subjecting a metal phthalocyanine in the presence of an organic liquid to an intensive mixing and shearing action with a solid grinding aid having an extremely small particle size. The mixture is ground until maximum strength has been developed, which is usually in a matter of two to four hours. The organic liquid is removed from the pigment mass by any suitable means depending upon the choice of liquid used, that is, the liquid may be steam stripped from the pigment mass or may be removed by a suitable washing operation. The pigment is thereafter water-washed, filtered and air-dried.

The particle size of the grinding aid used herein is expressed by means of surface area, that is, the smaller the particles, the greater is the surface area. Surface area measurements of small particles are usually expressed in terms of square meters per gram.

I have found that by using a grinding aid having a surface area ranging from 0.14 square meter per gram to 1.38 square meters per gram improved results are obtained in that the length of grinding time is materially reduced, and with the use of the fine particles as are contemplated herein the tinting strength of the pigment is increased to a considerable extent.

Solid grinding aids having a particle size that are useful in this invention may be obtained by the use of a microatomizer, jet-mill, or other suitable commercial machines and the invention is not restricted to any particular method of preparing the grinding aid of the desired particle size.

I may use as the solid grinding aid any material suitable for this purpose, such as, for example, sodium chloride, calcium carbonate, or finely-divided materials such as diatomaceous earth, blanc fixe, powdered silica, soluble carbohydrates and the like, and which may be removed, if desired, after the grinding operation has been completed by means of a suitable washing operation.

The conditions of grinding are not unduly critical. While the grinding may be carried out in a ball mill, rod mill, or the like, such devices require a large body of liquid, and since such fluid slurries materially increase the length of time the pigment must be ground to obtain maximum tinctorial strength, there is little or no advantage to be gained by their use. Consequently, I prefer to use a lesser quantity of liquid so that a pasty or doughly mass is formed. It is preferred, therefore, to use that type of apparatus which is capable of exerting a shearing action on the relatively stiff pasty material such as a dough mixer or other apparatus capable of exerting an intensive mixing and shearing attrition. With this type of apparatus, the practical limits of the liquid employed may be defined as between 1½ to 2 parts per part of pigment when a high ratio of the order of 9 parts of solid grinding aid to 1 part of pigment is employed. It is entirely feasible, however, to reduce the amount of liquid used to as little as 0.85 part per part of pigment particularly when the ratio of grinding aid to pigment employed is of the order of 3 or 4 to 1. Below the ratio of 0.85 part of liquid to one part of pigment, the charge becomes too crumbly to grind well. Excessive amounts of liquid have no effect other than to increase the time of grinding needed to develop ultimate strength.

A wide variety of organic liquids may be used in the grinding operation. I may use aromatic hydrocarbons or chlorinated hydrocarbons such as xylene, toluene, trichlorobenzene, etc. I may also use aliphatic compounds such as the lower ketones, alcohols, ethers and esters. As practical examples of such liquids, there may be mentioned acetone, diisobutylketone, ethanol, isopropanol, ethylene glycol, diethylene glycol, glycerol, amyl ether and ethyl acetate.

In general, in the prior art the foregoing organic liquids have usually been removed from the pigment mass by a distillation process and many of them, for example xylene and toluene, cannot be removed practically by any other means. I prefer to use those liquids which need not be steam stripped from the pigment mass, such as aniline, for example, which are more particularly described and claimed in the copending application of Volney Tullsen, Serial No. 251,812, filed concurrently herewith. There is a definite advantage in using such liquids as it is possible to get additional tinctorial strength.

As stated hereinbefore, the process of the present invention is applicable both to chlorine-free metal phthalocyanines and chlorinated metal phthalocyanines. When the chlorine-free phthalocyanines are ground with the solid grinding aid in the presence of one of the organic liquids which exerts a crystallizing action thereon, not only does a fine subdivision of the pigment occur but the which exhibits high tinctorial strength but the pigment is further characterized by tinctorial stability in aromatic solvents customarily used in paint, enamel and lacquer systems. Additionally, the shade of the blue pigment is shifted substantially toward the green indicative of the stable alpha crystal form. Since the chlorinated phthalocyanines exist for the most part in the beta crystal form and are for all practical purposes sufficiently resistant to crystal change in the presence of aromatic solvents, when such phthalocyanines are treated in accordance with the present invention a fine subdivision of the product occurs and the resulting pigment exhibits high tinctorial strength.

The terminology used herein in referring to the alpha and beta crystal forms of the phthalocyanine blue is in accordance with the nomenclature used by R. H. Kienle in Official Digest, Federation of Paint and Varnish Production Clubs, No. 300, page 48, January 1950.

The following examples are illustrative of the present invention, all parts being by weight unless otherwise specified.

*Example 1*

605 parts of acid-pasted chlorine-free copper phthalocyanine, 1210 parts of aniline and 5460 parts of microatomized salt having a surface area of 0.14 square meter per gram were charged into a dough mixer and mixed for 12 hours, the temperature of the charge being maintained below 30° C. Sample portions were removed from the charge every 2 hours and the pigment in the individual portions was isolated by slurrying in dilute hydrochloric acid, thereafter filtered, washed acid-free and subsequently air-dried at about 60° C. The dried pigment was then evaluated against a prior art phthalocyanine pigment finished in commercially acceptable form by grinding in a crystallizing organic liquid with a grinding aid having a surface area of 0.06 square meter per gram. The evaluations made were tinting strength, brightness and depth of masstone. The pigment products produced herein had increased brightness, greenness of shade and depth of masstone as compared to the prior art product. Ink rub-outs of these pigments indicated a tinctorial strength which was as much as 25% stronger than such prior art product. These rub-outs also showed that maximum tinctorial strength was obtained after about 4 to 6 hours grinding and that continued grinding for the 12-hour period resulted in no further increase in tinting strength.

*Example 2*

The procedure of Example 1 was repeated with the sole exception that 5460 parts of microatomized salt having a surface area of 0.86 square meter per gram were substituted for the microatomized salt used in Example 1. The product was identical in all respects with the product of Example 1. Ink rub-outs showed that maximum tinctorial strength was developed in a matter of 2 to 4 hours.

*Example 3*

The procedure of Example 1 was repeated with the exception that 1210 parts of acetone were substituted for the aniline used in Example 1 and 5460 parts of microatomized salt having a surface area of 0.86 square meter per gram were substituted for the microatomized salt used in Example 1. The acetone was removed by a water wash and the pigment was recovered as specified in Example 1. The product of this example was substantially identical to the product of Example 1. Ink rub-outs showed that maximum tinctorial strength was developed in about 4 to 6 hours grinding.

*Example 4*

The procedure of Example 1 was repeated with the sole exception that 1210 parts of xylene were substituted for the aniline used in Example 1. The xylene was removed by steam stripping and the pigment was recovered as in Example 1. Ink rub-outs showed that this product had increased brightness, greenness of shade and depth of masstone as compared to the prior art product.

*Example 5*

The procedure of Example 1 using xylene as in Example 4 was repeated. The xylene was removed by an alcohol wash followed by a water wash and the pigment was recovered as specified in Example 1. The product of this example was slightly stronger in tinctorial value than the product of Example 4.

*Example 6*

The procedure of Example 1 was repeated with the exceptions that 1210 parts of xylene were substituted for the aniline used in Example 1 and 5460 parts of microatomized salt having a surface area of 0.86 square meter per gram were substituted for the microatomized salt used in Example 1. The xylene was removed as in Example 5. The product of this example had a tinctorial strength which was 18% greater than the prior art product. Maximum tinting strength was obtained in about 4 to 6 hours grinding.

Example 7

The procedure of Example 1 was repeated except that 908 parts of aniline were used and the microatomized salt used had a surface area of 1.38 square meters per gram. Ink rub-outs showed that maximum tinctorial value was obtained in about 2 hours of grinding and the tinting strength was found to be 30% stronger than the prior art product.

Example 8

30 parts of acid-pasted chlorine-free copper phthalocyanine were charged to a steam-jacketed dough mixer and 30 parts of aniline oil were added with stirring. 105 parts of microatomized salt having a surface area of 0.72 square meter per gram were slowly added. The mass was heated to about 70° C. with constant working. The product was then cooled to about 28° C. and the working continued while cooling with water for 12 hours. The material was transferred to a tub containing about 3600 parts of water and 27 parts of real sulfuric acid which had been preheated to about 50° C. The mixture was agitated for about 1 hour to solubilize the aniline and the pigment was thereafter filtered, washed free of acid and air-dried at 60° C. When the dry pigment was tested in a standard varnish clear, the color was found to be strong, bright and greenish-blue. On a part by weight basis, this example contains one part of color, three parts of microatomized salt and 0.85 part of aniline.

Example 9

The procedure of Example 8 was repeated except that 315 parts of microatomized salt having a surface area of 1.38 square meters per gram and 56 parts of aniline were used. The finished pigment, when ground with a lithographic varnish and tested for strength in the usual manner, was found to be a strong, bright greenish-blue.

Example 10

The procedure of the preceding example was repeated except that the amount of aniline was reduced to 35 parts. The pigment color strength obtained by this procedure was not quite as great as that obtained in the preceding example but was quite satisfactory.

Example 11

The procedure of Example 9 was repeated except that the amount of aniline was increased to 70 parts. This gave a better grinding consistency than that obtained in Example 9 and the color value of the ultimate pigment was about equal to that obtained by following the procedure of Example 9.

Example 12

The procedure of Example 11 was repeated except the amount of aniline was increased to 105 parts. The cohesive workability of the mass was satisfactory and the color value of the pigment was approximately the same as that obtained in Example 11.

Example 13

The procedure of Example 9 was repeated except that 157.5 parts of microatomized salt and 35 parts of aniline were used. The pigment obtained was bright greenish-blue and had good tinctorial value.

Example 14

The procedure of Example 9 was repeated except that 70 parts of microatomized salt and 18.75 parts of aniline were used. The pigment obtained was a bright greenish-blue.

Example 15

The procedure of Example 8 was repeated except that the microatomized salt used had a surface area of 0.61 square meter per gram. The pigment obtained by this procedure was commercially satisfactory.

Example 16

The procedure of Example 8 was repeated except that the microatomized salt used had a surface area of 0.45 square meter per gram. The pigment obtained was a clear greenish-blue shade.

Example 17

The procedure of Example 9 was repeated with the exception that acid-pasted zinc phthalocyanine was substituted for the copper phthalocyanine used in Example 9. The product was ground and isolated as specified therein and a bright blue crystallization resistant pigment was obtained.

Example 18

The procedure of Example 9 was repeated using acid-pasted nickel phthalocyanine instead of the copper phthalocyanine used therein. An olive green shade crystallization resistant pigment was obtained.

Example 19

30 parts on a dry basis of crude chlorine-free copper phthalocyanine were charged to a steam-jacketed dough mixer and 56 parts of aniline were added with stirring. 315 parts of microatomized salt having a surface area of 1.38 square meters per gram were added. The mass was heated to 70° C. with constant working. The product was cooled to about 28° C. and the working continued while cooling with water for 12 hours. The material was drowned in 3600 parts of water containing 27 parts of real sulfuric acid. The slurry was agitated for 1 hour and the pigment was thereafter filtered, washed acid-free and air-dried at 60° C. The resulting strong green shade blue pigment had substantially the same properties as the pigment prepared in Example 9.

Example 20

126 parts of phthalonitrile, 35 parts of anhydrous cupric chloride and 1260 parts of nitrobenzene were heated with vigorous agitation to 211° C. The charge was held at 211° C. with vigorous refluxing taking place. The charge was then cooled and the crude pigment was isolated by filtering and washing out the nitrobenzene with methanol and air-dried at 60° C. An analysis of the product showed a chlorine content of 4.82%. 40 parts of the thus prepared crude monochlorinated copper phthalocyanine, 360 parts of microatomized salt having a surface area of 1.38 square meters per gram and 64 parts of aniline were entered into a dough mixer. The charge was worked for 8 hours and was thereafter slurried in 2000 parts of hot water containing 250 parts of 10% hydrochloric acid. The material was stirred for 1 hour, filtered, washed acid-free and dried. The resulting blue pigment had a reddish shade and was of good tinctorial value. When the pigment was made up in a commercial paint formulation and stored for a prolonged period of time, there was no evidence of crystal change as evidenced by no loss in tinting strength or change in shade.

*Example 21*

40 parts of crude monochlor copper phthalocyanine prepared in accordance with the procedure set forth in Example 20, 60 parts of aniline, and 360 parts of microatomized salt having a surface area of 0.72 square meter per gram were charged to a dough mixer. The charge was mixed for 8 hours, after which it was slurried in dilute sulfuric acid solution to remove the salt and aniline, sufficient acid being added to dissolve the aniline. The pigment was filtered, washed free of acid, washed in methanol, reslurried in methanol, filtered, and washed free of methanol, after which it was dried. The resulting strong red shade blue pigment had substantially the same properties as the product of Example 20.

*Example 22*

40 parts of crude monochlor copper phthalocyanine prepared in accordance with the procedure set forth in Example 20 were dissolved in 400 parts of concentrated sulfuric acid at 50° C. with stirring. The mixture was stirred until dissolved and 40 parts of xylene were added. The stirring was continued until sulfonation of the xylene was substantially completed. The pigment solution was then drowned in a mixture of 1600 parts of ice and 400 parts of water. The pigment slurry which formed was filtered, washed acid-free and dried. 39½ parts of this acid-pasted products, 360 parts of microatomized salt having a surface area of 1.38 square meters per gram and 120 parts of aniline were charged to a dough mixer. The charge was mixed for 14 hours after which it was slurried in just sufficient acid and water to dissolve the salt and the aniline. The material was then filtered, washed free of acid, and dried. A crystallization resistant red shade monochlor copper phthalocyanine blue pigment of good tinctorial value was obtained.

*Example 23*

The following charge was worked in a dough mixer: 40 parts of monochlor copper phthalocyanine blue prepared in accordance with the procedure of Example 20 and acid-pasted by the procedure set forth in Example 22, 40 parts of aniline and 40 parts of microatomized salt having a surface area of 0.45 square meter per gram. The charge was mixed for 12 hours, after which it was slurried in dilute sulfuric acid solution to dissolve the salt and aniline. The product was then filtered, washed free of acid and air-dried. A strong red shade crystallization resistant monochlor copper phthalocyanine blue pigment was obtained.

*Example 24*

50 parts of monochlor copper phthalocyanine prepared in accordance with the procedure of Example 20 and acid-pasted by the procedure set forth in Example 22, 550 parts of microatomized salt having a surface area of 0.86 square meter per gram and 160 parts of diethylene glycol were charged to a dough mixer and ground for 8 hours. The charge was mixed with 4000 parts of water and the pigment was filtered, washed and dried at 60° C. A crystallization resistant red shade monochlor copper phthalocyanine pigment of good tinctorial value was obtained.

*Example 25*

40 parts of an acid-pasted copper phthalocyanine pigment containing about 23.8% chlorine, 360 parts of microatomized salt having a surface area of 0.86 square meter per gram and 100 parts of aniline were entered into a dough mixer and ground for 8 hours. The charge was stirred into 3000 parts of water containing 50 parts real hydrochloric acid and agitated for 2-3 hours, after which the pigment was filtered, washed with 1000 parts of 1% hydrochloric acid, washed acid-free and dried at 60° C. This polychlorinated product was a very bright green pigment when compared to the monochlorinated product of example 20. The product had excellent can stability.

I claim:
1. The method of producing a tinctorially strong, metallized phthalocyanine pigment in a finely-divided pigmentary state which comprises subjecting a metallized phthalocyanine pigment to grinding in the presence of an organic liquid with a solid grinding aid having a surface area of at least 0.14 square meter per gram, the quantity of organic liquid present being sufficient to convert the pigment-grinding aid mixture to a doughy mass, and thereafter isolating the pigment from the ground mass.

2. The method according to claim 1 wherein the metallized pigment is a chlorinated phthalocyanine pigment.

3. The method according to claim 1 wherein the solid grinding aid has a surface area of from about 0.14 square meter per gram to about 1.38 square meters per gram.

4. The method according to claim 3 wherein the metallized pigment is a chlorinated phthalocyanine pigment.

5. The method of producing a tinctorially strong, chlorine-free copper phthalocyanine pigment in a finely-divided pigmentary state which comprises subjecting the pigment to grinding in the presence of an organic liquid with microatomized salt having a surface area of at least 0.14 square meter per gram, the quantity of organic liquid present being sufficient to convert the pigment-salt mixture to a doughy mass, extracting the salt and organic liquid with dilute aqueous acid, and thereafter drying the pigment.

6. The method according to claim 5 wherein the microatomized salt has a surface area of from about 0.14 square meter per gram to about 1.38 square meters per gram.

THOMAS D. MUTAFFIS.

References Cited in the file of this patent

UNITED STATES PATENTS

| Number | Name | Date |
|---|---|---|
| 2,486,304 | Loukomsky | Oct. 25, 1949 |
| 2,556,728 | Graham | June 12, 1951 |
| 2,556,729 | Stallman | June 12, 1951 |
| 2,556,730 | Graham | June 12, 1951 |